United States Patent
Kato et al.

(10) Patent No.: US 10,897,390 B2
(45) Date of Patent: Jan. 19, 2021

(54) TAKEOVER METHOD OF PROCESS, CLUSTER CONSTRUCTION PROGRAM AND CLUSTER CONSTRUCTION APPARATUS

(71) Applicant: FUJITSU LIMITED, Kanagawa (JP)

(72) Inventors: Sho Kato, Yokohama (JP); Kazuhiro Taniguchi, Kawasaki (JP); Akitaka Kamauchi, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 23 days.

(21) Appl. No.: 16/242,595

(22) Filed: Jan. 8, 2019

(65) Prior Publication Data
US 2019/0229979 A1 Jul. 25, 2019

(30) Foreign Application Priority Data

Jan. 24, 2018 (JP) .................................. 2018-010095

(51) Int. Cl.
G06F 15/177 (2006.01)
H04L 12/24 (2006.01)
H04L 29/08 (2006.01)
H04L 29/14 (2006.01)

(52) U.S. Cl.
CPC ...... H04L 41/0668 (2013.01); H04L 41/0672 (2013.01); H04L 41/0893 (2013.01); H04L 67/1044 (2013.01); H04L 67/1059 (2013.01); H04L 67/1095 (2013.01); H04L 69/40 (2013.01)

(58) Field of Classification Search
CPC . H04L 69/40; H04L 67/1044; H04L 41/0668; H04L 41/0672; H04L 41/0893; H04L 67/1059; H04L 67/1095
USPC .......................................................... 709/220
See application file for complete search history.

(56) References Cited

U.S. PATENT DOCUMENTS

| | | | | |
|---|---|---|---|---|
| 5,828,889 A | 10/1998 | Moiin et al. | | |
| 2004/0123053 A1* | 6/2004 | Karr | .................... | G06F 11/0745 711/152 |
| 2008/0209136 A1* | 8/2008 | Qi | .................... | G06F 3/0622 711/148 |
| 2009/0313311 A1* | 12/2009 | Hoffmann | ........... | G06F 11/2097 |
| 2010/0205273 A1* | 8/2010 | Shim | .................... | G06F 11/1425 709/210 |
| 2015/0058298 A1* | 2/2015 | Earl | .................... | G06F 11/1464 707/674 |
| 2015/0269039 A1* | 9/2015 | Akirav | ................ | G06F 11/2092 714/4.11 |
| 2016/0094436 A1* | 3/2016 | Elder | .................... | H04L 45/245 370/225 |

FOREIGN PATENT DOCUMENTS

| | | |
|---|---|---|
| JP | 10-116259 | 5/1998 |
| JP | 2010-186472 | 8/2010 |
| WO | 2011/135628 | 11/2011 |

* cited by examiner

*Primary Examiner* — Oleg Survillo
(74) *Attorney, Agent, or Firm* — Fujitsu Patent Center (57) ABSTRACT

A method for taking over a process in a processing system that includes a plurality of node groups, the method includes: determining, by a processor of a computer configured to belong to a first group among the plurality of node groups, whether a communication failure with any other of the plurality of node groups is detected; and starting a takeover process with a first priority according to a total number of nodes included in the first group, when the communication failure is detected.

15 Claims, 11 Drawing Sheets

| PRIORITY | COMPONENT NODE NUMBER OF CLUSTER GROUP | HANDICAP OF CLUSTER GROUP |
|---|---|---|
| 1 | MAJORITY, OR ONE HALF IN WHICH OPERATION NODE EXISTS | NO |
| 2 | SMALLER THAN ONE HALF IN WHICH OPERATION NODE EXISTS | MINIMUM VALUE |
| 3 | ONE HALF OR LESS IN WHICH OPERATION NODE DOES NOT EXIST | MINIMUM VALUE |

FIG. 4

| STANDBY NODE | WRITING PERFORMANCE | NODE PRIORITY | HANDICAP |
|---|---|---|---|
| A | 54M/sec | 3 | 30s |
| B | 63M/sec | 1 | 10s |
| C | 57M/sec | 4 | 40s |
| D | 59M/sec | 5 | 50s |
| E | 61M/sec | 2 | 20s |

| TARGET | CLUSTER GROUP NODE NUMBER | RELATED ART | EMBODIMENT |
|---|---|---|---|
| OPERATION NODE | MAJORITY | DEGENERACY POSSIBLE | FIRST PRIORITY (NO HANDICAP) |
| | ONE HALF | DEGENERACY NOT POSSIBLE | SECOND PRIORITY (MINIMUM HANDICAP) |
| | SMALLER THAN ONE HALF | DEGENERACY NOT POSSIBLE | DEGENERACY NOT POSSIBLE |
| | 1 | | |
| STANDBY NODE | MAJORITY | DEGENERACY POSSIBLE | FIRST PRIORITY (NO HANDICAP) |
| | ONE HALF | DEGENERACY NOT POSSIBLE | THIRD PRIORITY (MINIMUM HANDICAP) |
| | SMALLER THAN ONE HALF | DEGENERACY NOT POSSIBLE | DEGENERACY NOT POSSIBLE |
| | 1 | | |

TAKEOVER METHOD OF PROCESS, CLUSTER CONSTRUCTION PROGRAM AND CLUSTER CONSTRUCTION APPARATUS

CROSS-REFERENCE TO RELATED APPLICATION

This application is based upon and claims the benefit of priority of the prior Japanese Patent Application No. 2018-10095, filed on Jan. 24, 2018, the entire contents of which are incorporated herein by reference.

FIELD

The embodiment discussed herein relates to a takeover method of a process, a cluster construction program and a cluster construction apparatus.

BACKGROUND

If a failure occurs with an operation node in a cluster system that includes an operation node and a plurality of standby nodes, one of the standby nodes becomes an operation node and takes over a process of the operation node. Here, each node is an information processing apparatus that manages, for example, a database. The operation node is an information processing apparatus that performs update of the database, and each standby node is an information processing apparatus that includes a duplicate of the database and receives an update difference of the database from the operation node to update the own database.

In a multi standby system that includes a plurality of standby nodes, it is required to suppress occurrence of split brain. Here, the split brain is that a cluster system is interrupted by a failure of hardware or interconnect and a plurality of standby node groups try to take over the process of the operation node.

Figure 9:
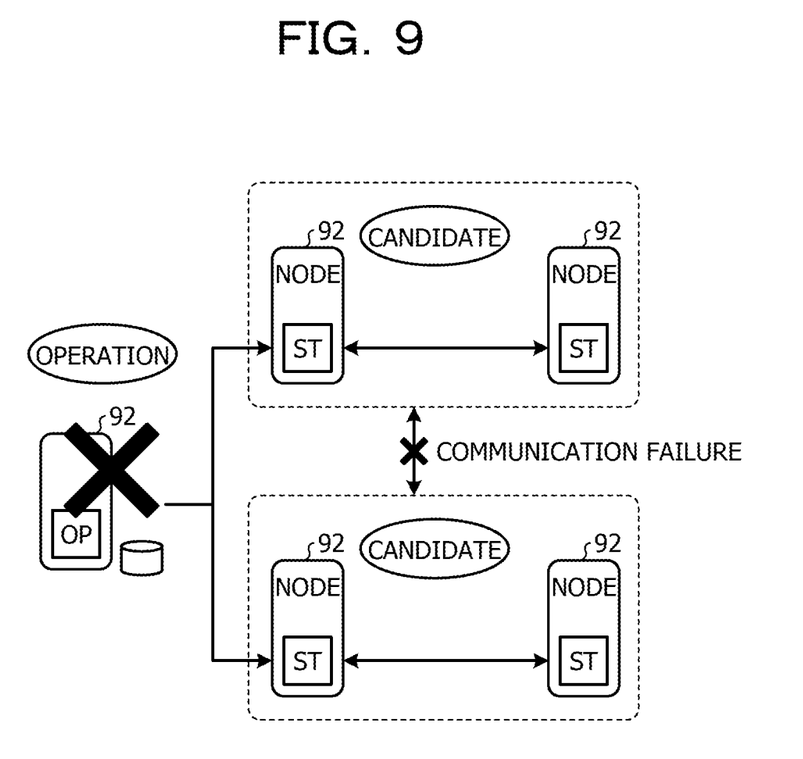
FIG. 9 illustrates split brain suppression in a multi standby system.

FIG. 9 is a view illustrating suppression of split brain in a multi standby system. In FIG. 9, a node 92 indicated by "OP" is an operation node and a node 92 indicated by "ST" is a standby node. In the case where a failure occurs with the operation node, if the standby nodes may agree which standby node is to be set as an operation node, the split brain may be suppressed.

However, if some abnormality occurs in communication between the standby nodes, the agreement among the standby nodes is interrupted and failover stop occurs. On the other hand, if simultaneous striking each other occurs by fencing of a companion node, both systems shutdown occurs. Here, the fencing signifies removal of the node 92 from the cluster system.

In order to suppress occurrence of such failover stop or both systems shutdown as described above, there is a technology which includes provision of a third party node for determining which standby node is to be set to the operation node. However, if the third party node is provided, the third party node becomes a single failure point, and the availability that increases in proportion to the number of standby nodes may not be implemented.

Therefore, it is expected to adopt quorum. In the quorum, a node group in which a majority or more of nodes 92 in the cluster system are communicatable inherits the cluster system to suppress the split brain.

It is to be noted that, as a technology relating to the split brain, there is a technology to determine a major group in a split brain situation that occurs in a network-based distributed computing environment. In this technology, the number of nodes of a first group and the number of nodes of a second group are compared with each other and history information of the nodes of the first group and the nodes of the second group is acquired. Then, the technology determines the first group or the second group as a major group using at least one of a result of the comparison of the node numbers and the history information.

Further, there is a technology to select, in the case where network split occurs, a group optimum for construction as a cluster is selected from processing contents of the groups. In this technology, a given node from among a plurality of nodes retains a given condition and generates information of the own node ready for the given condition, and collects information of other nodes ready for the given condition from other nodes that may communicate through a monitoring path. Further, in the case where there is information of the own node or information of other nodes, the given node generates a priority of the own group configured from nodes communicatable through the monitoring path and including at least the own node based on the information of other nodes and the information of the own node. Then, the given node determines a group to be reconstructed as a cluster based on the priority of the own group and the priority of a different group configured from nodes with which the own node is not capable of communicating through the monitoring path.

Further, as a technology relating to quorum, there is a quorum mechanism which does not require, in a two-node distributed computer system, that a node with which a failure occurs abandons a reservation of a shared resource. In the quorum mechanism, each node of the distributed computer system in which a failure occurs performs competition for achieving quorum by allowing success in reservation of two shared storage apparatus designated as quorum controllers. Within a period of time of normal operation of the distributed computer system, each of the quorum controllers is associated with and reserved by the nodes. Within the competition for the quorum responsive to failure detection of the distributed computer system, the nodes with which a failure does not occur forcibly reserve quorum controllers relating to other nodes. In the case where one node retains a reservation for both quorum controllers, this means that the node acquires the quorum.

Examples of the related art include Japanese Laid-open Patent Publication No. 2010-186472, International Publication Pamphlet No. WO 2011/135628 and Japanese Laid-open Patent Publication No. 10-116259.

SUMMARY

According to an aspect of the embodiment, a method for taking over a process in a processing system that includes a plurality of node groups, the method includes: determining, by a processor of a computer configured to belong to a first group among the plurality of node groups, whether a communication failure with any other of the plurality of node groups is detected; and starting a takeover process with a first priority according to a total number of nodes included in the first group, when the communication failure is detected.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The quorum has a problem that, since, in the quorum, a cluster node group in which a majority or more of component nodes are communicatable has the right for taking over the cluster system, if the node number decreases to less than the majority, the quorum becomes non-established and the cluster function stop.

According to one aspect, the embodiment discussed herein provides a technology for suppressing stopping of a cluster function even in the case where the number of nodes becomes less than a majority.

In the following, an embodiment of a takeover method for a process, a cluster construction program and a cluster construction apparatus disclosed herein is described in detail with reference to the drawings. It is to be noted that the embodiment does not restrict the technology disclosed herein.

First, a priority of a cluster group is described. Here, the cluster group is a group of nodes included in a cluster system. If an abnormality is detected, the cluster system is divided into a plurality of cluster groups. One or more nodes belong to each cluster group. Although communication between nodes is possible within a cluster group, communication is not possible between different cluster groups. In an initial state of the cluster system, the cluster system includes one cluster group to which all nodes included in the cluster system belong.

Figure 1A:
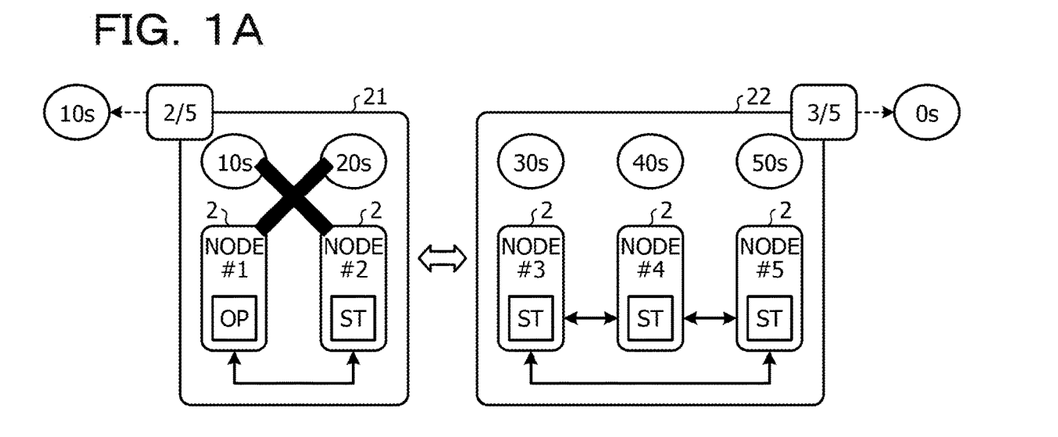
FIGS. 1A to 1C illustrate priorities of cluster groups.
Figure 1B:
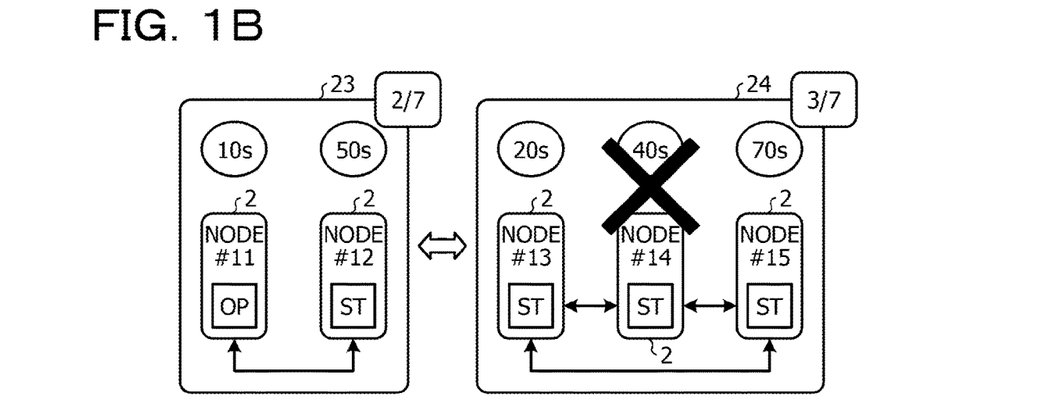
Figure 1C:
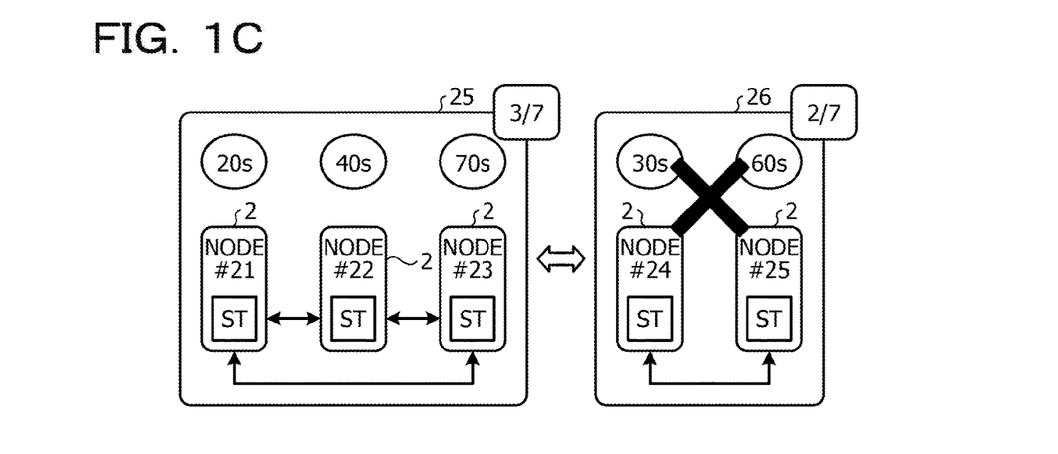

FIGS. 1A to 1C illustrate priorities of cluster groups. Referring to FIGS. 1A to 1C, a node 2 indicated by "OP" is an operation node, and a node 2 indicated by "ST" is a standby node. Each of 10 seconds (s) to 70 s applied above each node 2 denotes a handicap of the node. The handicap is the number of seconds before the node 2 starts fencing. The handicap of the operation node is smaller than the handicap of the standby nodes.

In FIG. 1A, five nodes 2 configuring a cluster system are divided into a cluster group 21 including two nodes (node #1 and node #2) and another cluster group 22 including three nodes (node #3 to node #5). The cluster group 22 is a cluster group whose component node number is a majority and takes over the cluster system in the first priority (priority is 1). The handicap of the cluster group 22 by which the cluster system is taken over is set to 0 s. Since the cluster group 22 does not include an operation node, the node #3 having the lowest handicap among the standby nodes becomes a leader and starts fencing after 0 s for the nodes 2 belonging to the cluster group 21.

On the other hand, the cluster group 21 is not a cluster group whose component node number is not a majority. Therefore, the handicap of the cluster group 21 is set to the minimum value 10 s of the handicap between the two nodes 2. The node #1 having the lowest handicap from between the two nodes 2 becomes a leader and tries to start fencing after 10 s. However, fencing has been performed by the leader of the cluster group 22 before that.

In FIG. 1B, seven nodes 2 configuring a cluster system are divided into a cluster group 23 of two nodes 2 (node #11 and node #12), another cluster group 24 of three nodes 2 (node #13 to node #15) and the remaining two nodes 2. The cluster system does not include a cluster group whose component node number is a majority, and the cluster group 23 that includes the operation node takes over the cluster system in a second priority. The handicap of the cluster group 23 that takes over the cluster system is set to the minimum value 10 s in the cluster group 23. Since the cluster group 23 includes the operation node, the operation node becomes a leader and starts fencing after 10 s for the nodes 2 belonging to the cluster group 24 and the remaining two nodes 2.

On the other hand, the cluster group 24 is not a cluster group whose component node number is a majority and does not include an operation node. Therefore, the handicap of the cluster group 24 is set to the minimum value of 20 s of the handicap among the three nodes 2. Although the node #13 that has the lowest handicap from among the three nodes 2 and tries to start fencing after 20 s, fencing has been performed by the leader of the cluster group 23 before that.

In FIG. 1C, seven nodes 2 configuring a cluster system are divided into a cluster group 25 of three nodes 2 (nodes #21 to node #23), another cluster group 26 of two nodes 2 (node #24 and node #25) and the remaining two nodes 2. The cluster system does not include a cluster group whose component node number is a majority nor includes a cluster group that includes an operation node. Therefore, the cluster group 25 that includes the node #21 whose handicap is smallest takes over the cluster system in the third priority. The handicap of the cluster group 25 that takes over the cluster system is set to the minimum value 20 s in the cluster group 25. The node #21 whose handicap is smallest in the cluster group 25 becomes a leader and starts fencing after 20 s for the nodes 2 belonging to the cluster group 26 and the remaining two nodes 2.

Meanwhile, the cluster group 26 is not a cluster group whose component node number is a majority and does not include an operation node. Therefore, the handicap of the cluster group 26 is set to the minimum value 30 s between the two nodes 2. The node #24 whose handicap is smallest from between the two nodes 2 becomes a leader and tries to start fencing after 30 s. However, fencing has performed by the leader of the cluster group 25 before that.

In this manner, each cluster group specifies a priority of the cluster group based on whether or not the component node number is a majority and whether or not the cluster group includes an operation node and performs or tries to perform fencing based on the specified priority. Accordingly, in the cluster system, even in the case where an abnormality occurs and the cluster system does not include a cluster group that includes a majority of nodes 2, stopping of the cluster function may be suppressed. It is to be noted that a case where the component node number of a cluster group is not a majority but is one half or else one is hereinafter described.

Figure 2:
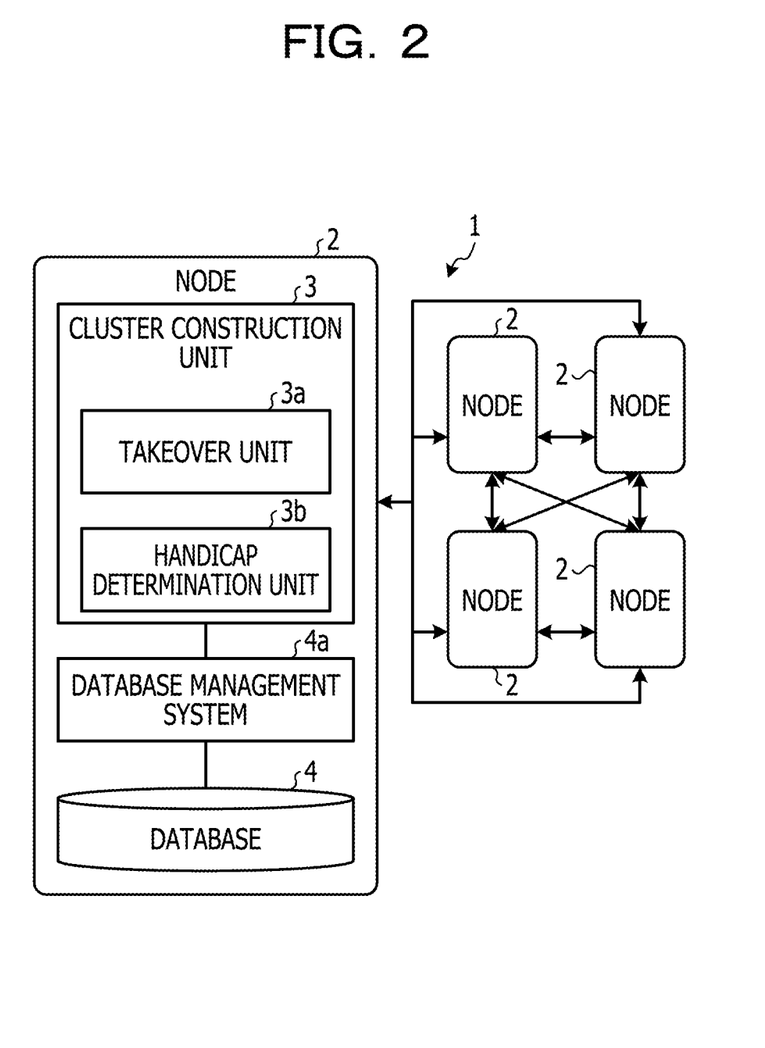
FIG. 2 depicts a configuration of a cluster system according to an embodiment.

Now, a configuration of a cluster system according to an embodiment is described. FIG. 2 depicts a configuration of a cluster system according to the embodiment. As depicted in FIG. 2, a cluster system 1 according to the embodiment includes five nodes 2. It is to be noted that the cluster system 1 may otherwise include the number of nodes 2 equal to or greater than three other than five.

Of the five nodes 2, one node 2 is an operation node while the remaining four nodes 2 are standby nodes. The operation node is an information processing apparatus that performs update of a database, and the standby nodes are information processing apparatuses each of which includes a duplicate of the database and receives an update difference of the database from the operation node to update the own database.

Each node 2 is coupled to the other nodes 2 by a network. As the network, there are a network that is used for communication relating to the database and communication for heartbeat and a network that is used for communication for fencing.

Each node 2 includes a cluster construction unit 3 that performs processing relating to construction of the cluster system 1, a database 4 and a database management system 4a that manages the database 4. The cluster construction unit 3 includes a takeover unit 3a and a handicap determination unit 3b.

The takeover unit 3a performs a process for suppressing stopping of the cluster function in the case where an abnormality occurs with the cluster system 1. For example, in the case where an abnormality occurs with the cluster system 1, the takeover unit 3a performs exchange of a handicap with the takeover unit 3a of the other nodes 2. Then, the takeover unit 3a determines the number of nodes 2 with which exchange of a handicap has been performed successfully as a node number of the cluster group to which the own node belongs. Further, the takeover unit 3a specifies whether or not an operation node is included in the cluster group to which the own node belongs.

Then, the takeover unit 3a specifies a priority of the cluster group to which the own node belongs based on the node number of the cluster group to which the own node belongs and whether or not an operation node is included in the cluster group to which the own node belongs. Then, the takeover unit 3a specifies a handicap and a leader of the cluster group to which the own node belongs based on the specified priority.

Figure 3:
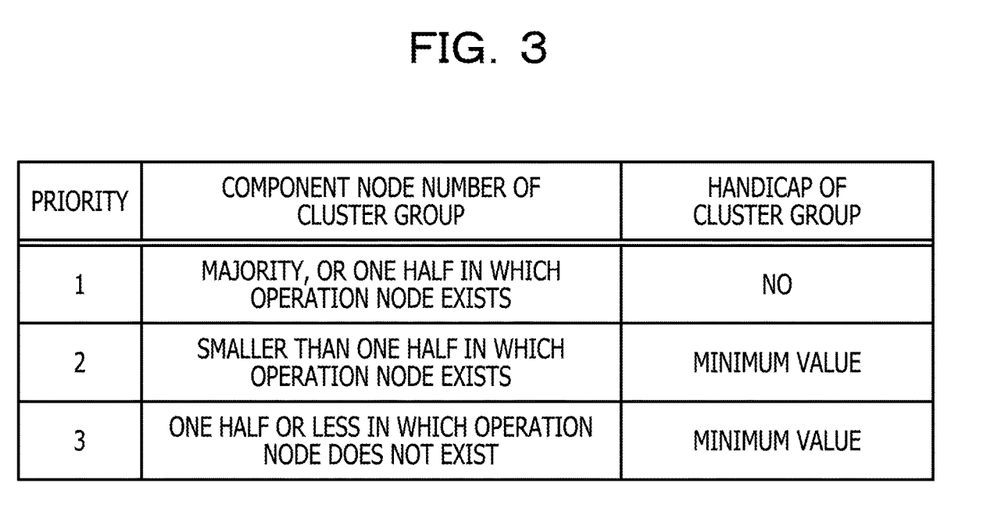
FIG. 3 depicts priorities and handicaps of cluster groups.

FIG. 3 depicts priorities and handicaps of cluster groups. As depicted in FIG. 3, in the case where the component node number of a cluster group is a majority or is one half in which an operation node exists, the priority of the cluster group is 1 and the cluster group has no handicap, for example, 0 s. Meanwhile, in the case where the component node number of a cluster group is smaller than one half in which an operation node exists, the priority of the cluster group is 2 and the cluster group has a handicap that is set to a minimum value of the handicap among the nodes 2 in the cluster group. On the other hand, in the case where the component node number of a cluster group is equal to or smaller than one half in which an operation node does not exist, the priority of the cluster group is 3 and the cluster group is set to a minimum value of the handicap among the nodes 2 in the cluster group.

Then, the takeover unit 3a of the node 2 specified as a leader performs or tries to perform fencing based on the handicap of the cluster group to which the own node belongs. Then, if fencing is not performed by any other node 2, the takeover unit 3a of the node 2 specified as the leader sets the own node as an operation node.

The handicap determination unit 3b determines a handicap of the own node. For example, in the case where the own node is an operation node, the handicap determination unit 3b acquires a writing performance from each standby node into the database 4, determines a handicap based on the writing performance and transmits the handicap to the standby node. As the writing performance decreases, the handicap increases.

On the other hand, in the case where the own node is a standby node, the handicap determination unit 3b measures a writing performance of a temporary file for accumulating update differences of the database 4, calculates an average value of measurement values and transmits the average value to the operation node. Then, the handicap determination unit 3b receives a handicap from the operation node and stores the handicap.

Figure 4:
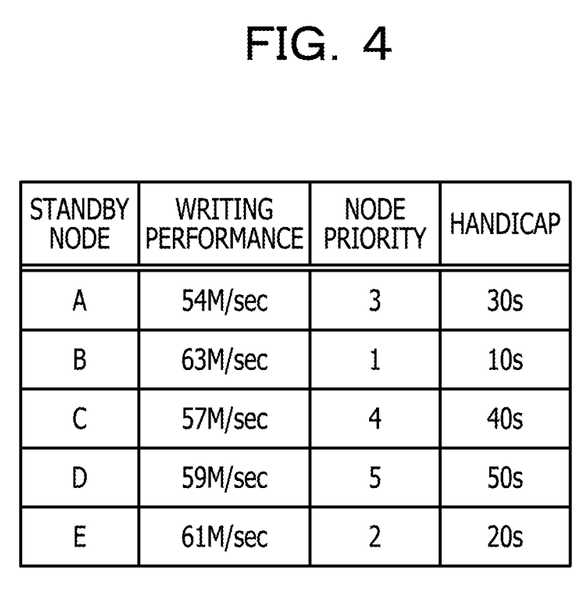
FIG. 4 depicts an example of handicaps.

FIG. 4 depicts an example of handicaps. In FIG. 4, a writing performance, a node priority and a handicap are associated with each other for each standby node. For example, in the case of a standby node A, the writing performance is 54 megabytes/second (M/sec), and since the writing performance is the third highest, the node priority is 3 and the handicap is 30 s.

Figure 5A:
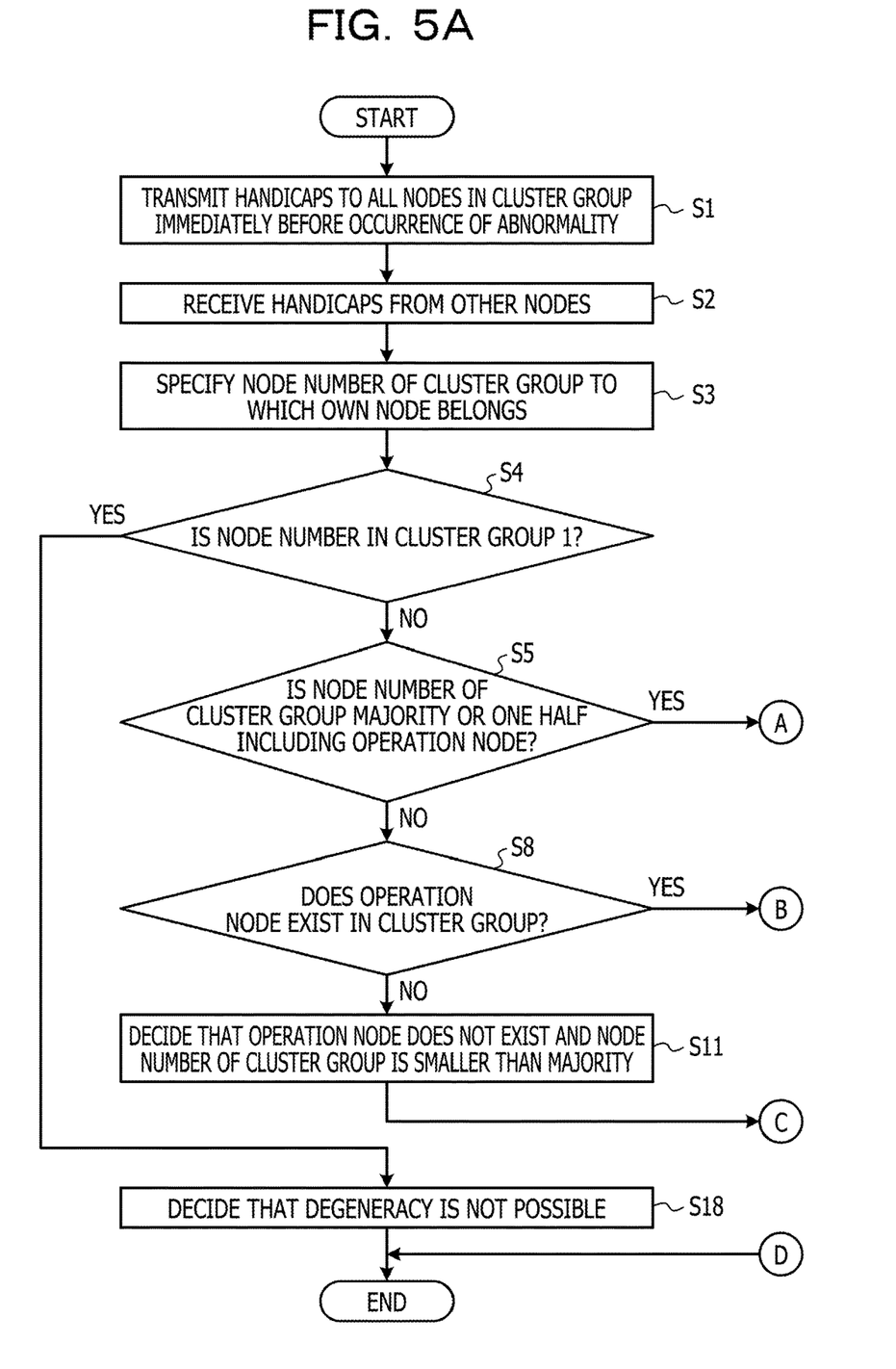
FIGS. 5A and 5B are a flow chart depicting a flow of processing by a takeover unit.
Figure 5B:
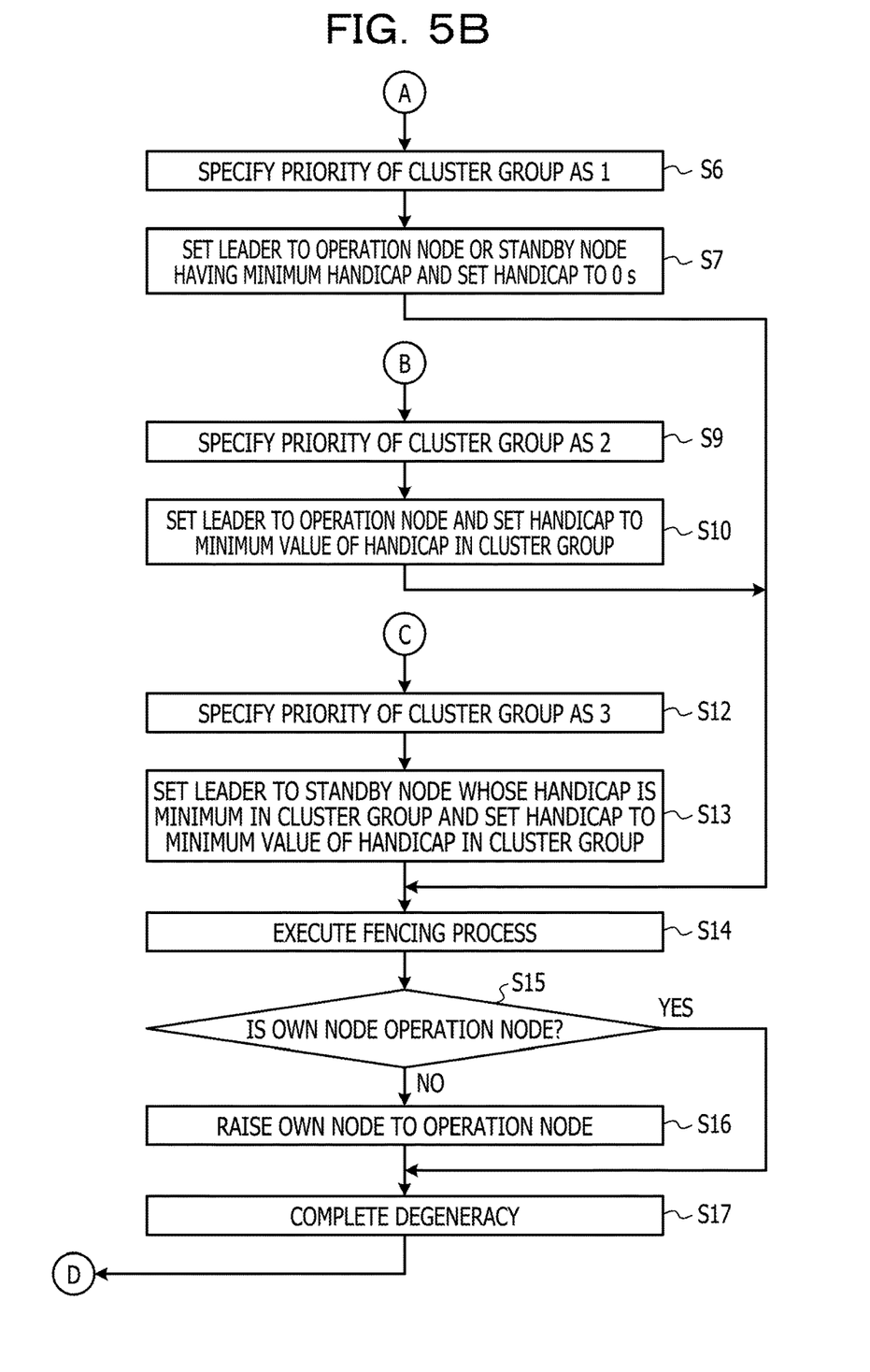

Now, a flow of processing by the takeover unit 3a is described. FIG. 5 (i.e., FIGS. 5A and 5B) is a flow chart of a flow of processing by a takeover unit. The takeover unit illustrated by reference to FIG. 5 may be the takeover unit 3a illustrated in FIG. 2. If a heartbeat response is interrupted and an abnormality occurs, the process depicted in FIG. 5 is started.

As depicted in FIG. 5, the takeover unit 3a transmits a handicap to all nodes 2 in the cluster group immediately before the occurrence of the abnormality (step S1). Further, the takeover unit 3a receives handicaps from the other nodes 2 (step S2) and specifies the number of nodes of the cluster group to which the own node belongs (step S3). The node number of the cluster group to which the own node belongs is a value obtained by addition of 1 to the number of the nodes from which a handicap is received.

Then, the takeover unit 3a decides whether or not the node number of the cluster group is 1 (step S4) and decides, in the case where the node number is not 1, whether or not the node number of the cluster group is a majority or is one half that includes an operation node (step S5).

Then, in the case where the node number of the cluster group is a majority or is one half that includes an operation node, the takeover unit 3a specifies the priority of the cluster group as 1 (step S6). Then, the takeover unit 3a sets the leader of the cluster group to an operation node or sets, in the case where no operation node is included in the cluster group, the leader of the cluster group to a standby node having the smallest handicap, and sets the handicap of the cluster group to 0 s (step S7). Then, the takeover unit 3a advances its processing to step S14.

On the other hand, in the case where the node number of the cluster group is not a majority and besides is not one half that includes an operation node, the takeover unit 3a decides whether or not an operation node exists in the cluster group (step S8). Then, in the case where an operation node exists in the cluster group, the takeover unit 3a specifies the priority of the cluster group as 2 (step S9). Then, the takeover unit 3a determines the leader of the cluster group as an operation node and determines the handicap of the cluster group to a minimum value of the handicap among the nodes in the cluster group (S10). Then, the takeover unit 3a advances the processing to step S14.

On the other hand, in the case where an operation node does not exist in the cluster group, the takeover unit 3a decides that an operation node does not exist and the node number of the cluster group is smaller than a majority (step S11) and specifies the priority of the cluster group as 3 (step S12). Then, the takeover unit 3a determines the leader to a standby node whose handicap is smallest in the cluster group and sets the handicap of the cluster group to a minimum value of the handicap among the nodes 2 in the cluster group (step S13).

Then, the takeover unit 3a of the leader executes a fencing process (step S14) and decides whether or not the own node is an operation node (step S15). Then, in the case where the own node is not an operation node, the takeover unit 3a of the leader raises the own node to an operation node (step S16). Then, the takeover unit 3a of the leader completes the degeneracy (step S17).

On the other hand, in the case where the node number of the cluster group is 1 at step S4, the takeover unit 3a decides that degeneracy is not possible (step S18) and ends the processing.

Since the takeover unit 3a specifies the priority based on the node number of the cluster group and presence or absence of an operation node in this manner, also in the case where the node number of the cluster group is smaller than a majority, the cluster system 1 may be degenerated. Here, to degenerate the cluster system 1 is to take over the cluster function in a state in which the number of nodes is degenerated.

Figure 6A:
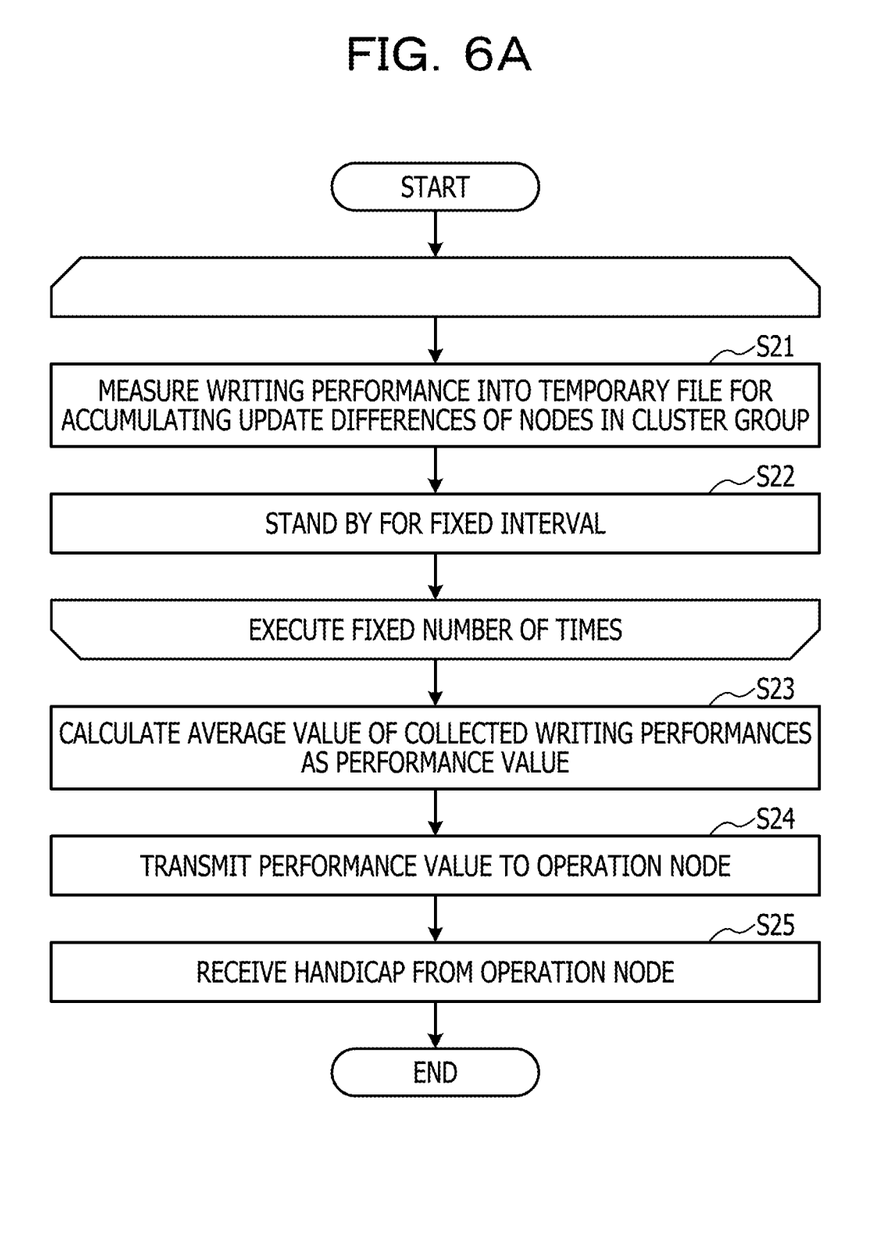
FIG. 6A is a flow chart depicting a flow of processing performed by a standby node in a process for determining a handicap.

Now, a flow of processing for determining a handicap is described. FIG. 6A is a flow chart depicting a flow of processing performed by a standby node in a process for determining a handicap, and FIG. 6B is a flow chart depicting a flow of processing performed by an operation node in a process for determining a handicap.

As depicted in FIG. 6A, the handicap determination unit 3b measures a writing performance into a temporary file for accumulating update differences of the nodes 2 in the cluster group (step S21) and performs a process for standing by for a regular interval by a fixed number of times (step S22).

Then, the handicap determination unit 3b of the standby node calculates an average value of the measured writing performances as a performance value (step S23) and transmits the calculated performance value to the operation node (step S24). Then, the handicap determination unit 3b of the standby node receives a handicap calculated by the operation node from the operation node (step S25).

Figure 6B:
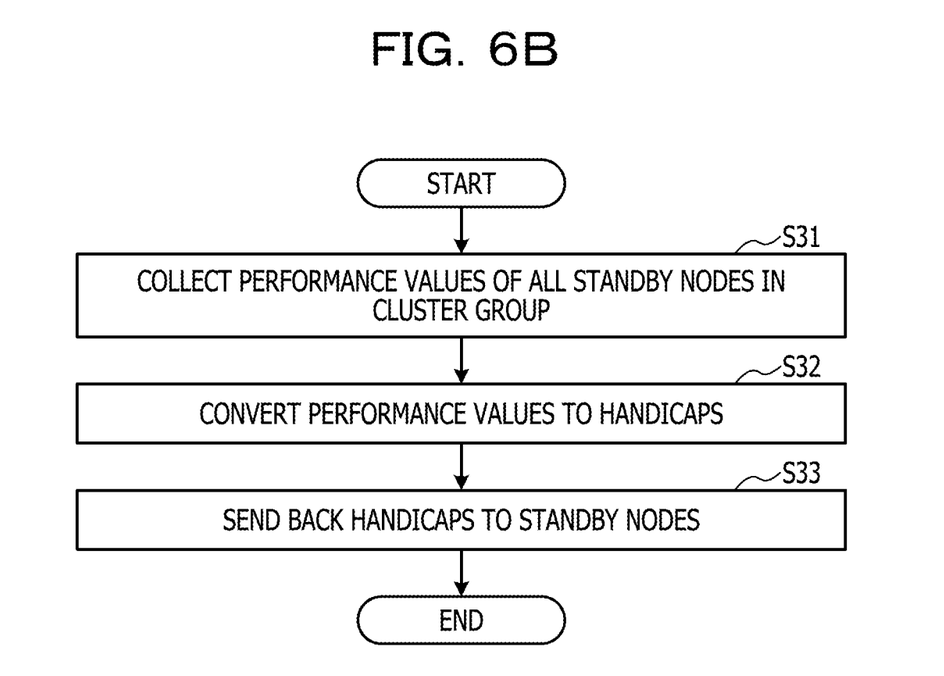
FIG. 6B is a flow chart depicting a flow of processing performed by an operation node in a process for determining a handicap.

Further, as depicted in FIG. 6B, the handicap determination unit 3b of the operation node collects performance values of all standby nodes in the cluster group (step S31) and converts the performance values into handicaps (step S32). Then, the handicap determination unit 3b of the operation node sends back the handicaps to the respective standby nodes (step S33).

Since the handicap determination unit 3b of each standby node and the handicap determination unit 3b of the operation node cooperate to determine handicaps of the individual nodes 2, the takeover unit 3a may specify a handicap of the cluster group using the handicaps of the individual nodes 2.

Figure 7:
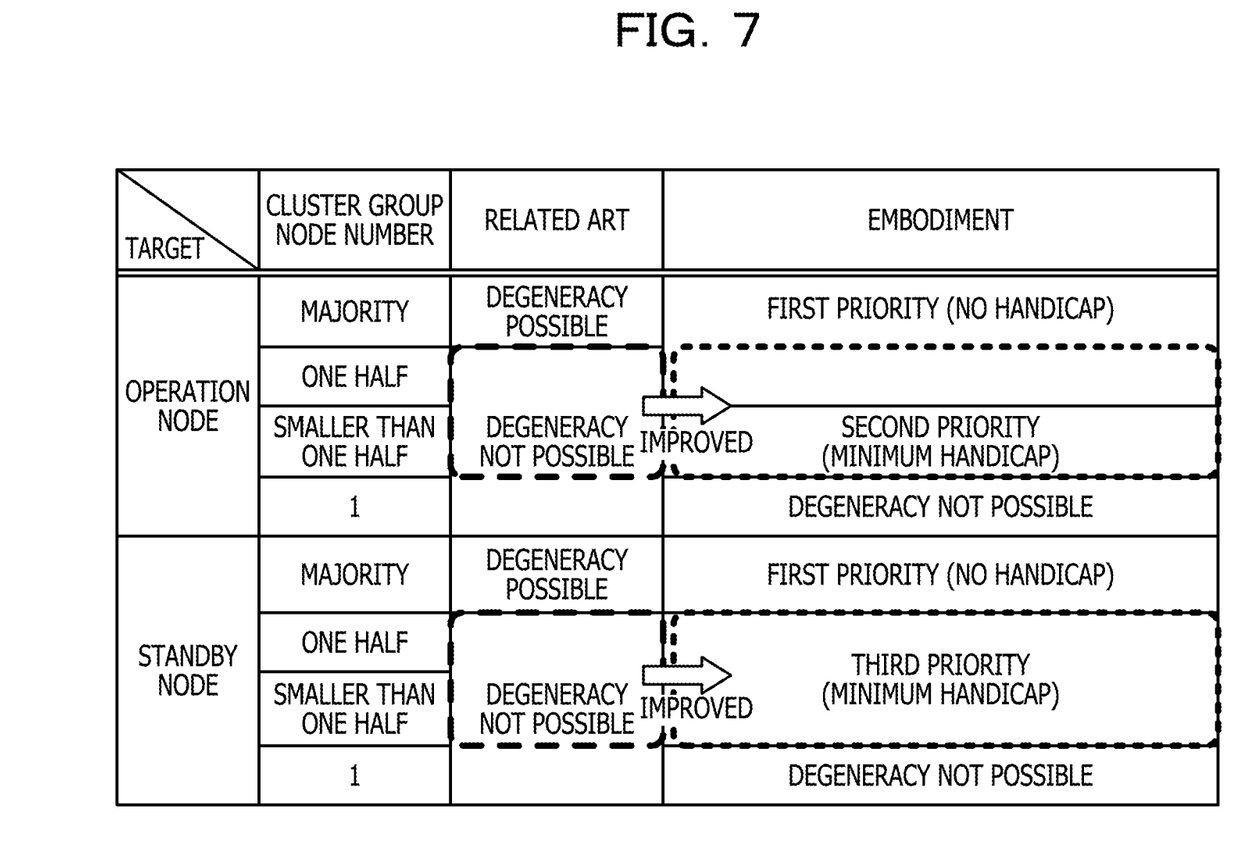
FIG. 7 illustrates an advantageous effect of a cluster system according to the embodiment.

Now, advantageous effects of the cluster system 1 according to the embodiment are described. FIG. 7 illustrates an advantageous effect of a cluster system according to the embodiment. The cluster system illustrated by reference to FIG. 7 may be the cluster system 1 illustrated in FIG. 2. As depicted in FIG. 7, in the case where an operation node is included in a cluster group, if the node number of the cluster group is not a majority, although degeneracy is not possible with the related art, in the cluster system 1 according to the embodiment, a cluster group of the first priority or the second priority is specified and degeneracy may be performed. On the other hand, in the case where an operation node is not included in a cluster group, if the node number of the cluster group is not a majority, although degeneracy is not possible with the related art, in the cluster system 1 according to the embodiment, a cluster group of the third priority is specified and degeneracy may be performed.

As described above, in the embodiment, if a communication failure occurs with a different cluster group, in the case where the node number of the cluster group to which the own node belongs exceeds one half, the takeover unit 3a determines that the cluster group has the first priority. Meanwhile, in the case where the node number of the cluster group to which the own node belongs is not 1 but does not exceed one half and the cluster group includes an operation node, the takeover unit 3a determines that the cluster group has the second priority. Further, in the case where the node number of the cluster group to which the cluster group belongs is not 1 but does not exceed one half and the cluster group does not include an operation node, the takeover unit 3a determines that the cluster group has the third group. Accordingly, even in the case where a communication failure occurs and the component node number of the cluster group becomes smaller than a majority, stopping of the cluster function may be suppressed.

Further, in the embodiment, the takeover unit 3a sets the handicap of a cluster group of the second priority or the third priority to a minimum value of the handicap among the nodes 2 included in the cluster group. Further, since the cluster group of the second priority includes an operation node, the handicap of a cluster group of the second priority is smaller than the handicap of a cluster group of the third priority. Accordingly, the cluster group of the second priority may perform fencing of the cluster group of the third priority.

Further, in the embodiment, the handicap determination unit 3b measures the writing performance into a temporary file for accumulating update differences and determines the handicap of each node 2 based on an average value of the measured writing performance. Accordingly, in the cluster system 1 according to the embodiment, upon takeover of the cluster function, a node 2 having a high writing performance may be determined as an operation node.

Further, in the embodiment, since the takeover unit 3a of a leader executes a fencing process based on the handicap of the cluster group, split brain may be suppressed.

It is to be noted that, while the cluster construction unit 3 is described in the description of the embodiment, a cluster construction program having a similar function may be obtained by implementing the cluster construction unit 3 by software. Thus, a computer that executes the cluster construction program is described.

Figure 8:
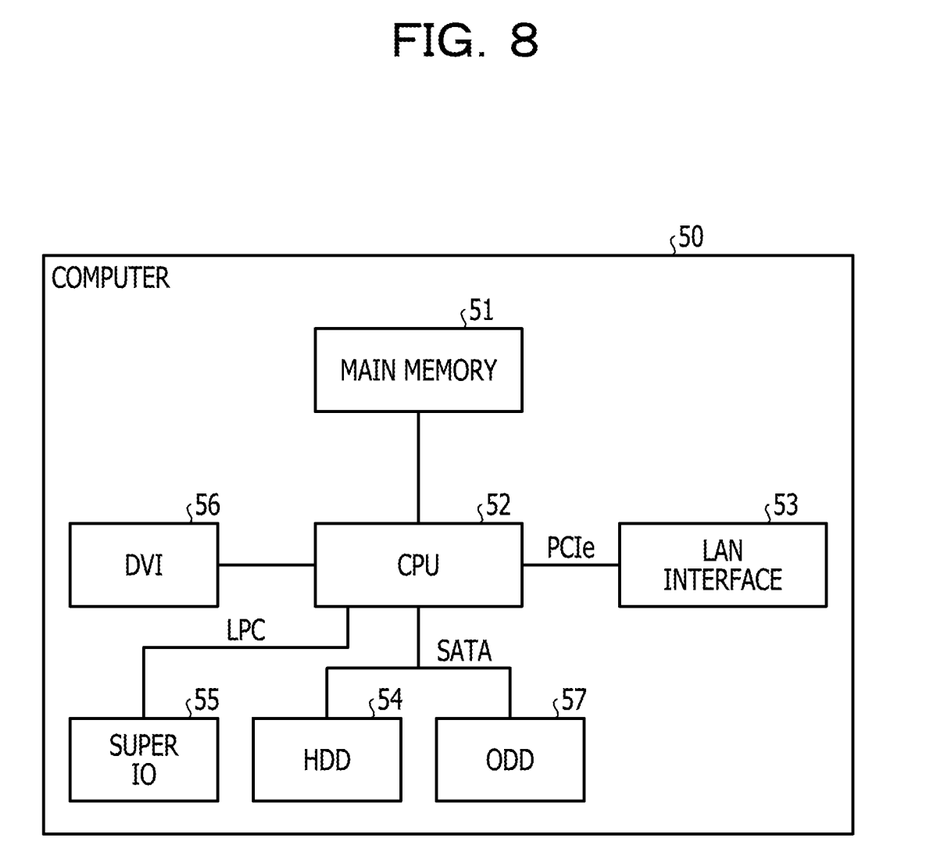
FIG. 8 depicts a hardware configuration of a computer that executes a cluster construction program according to the embodiment.

FIG. 8 is a view depicting a hardware configuration of a computer that executes a cluster construction program according to the embodiment. As depicted in FIG. 8, a computer 50 includes a main memory 51, a central processing unit (CPU) 52, a local area network (LAN) interface 53, and a hard disk drive (HDD) 54. The computer 50 further includes a super input output (10) 55, a digital visual interface (DVI) 56 and an optical disk drive (ODD) 57.

The main memory 51 is a memory for storing programs, in-progress results of the programs and so forth. The CPU 52 is a central processing unit that reads out a program from the main memory 51 and executes the program. The CPU 52 includes a chipset including a memory controller.

The LAN interface 53 is an interface for coupling the computer 50 to a different computer through a LAN. The HDD 54 is a disk apparatus for storing programs and data, and the super IO 55 is an interface for coupling an inputting apparatus such as a mouse, a keyboard and so forth. The DVI 56 is an interface for coupling a liquid crystal display device, and the ODD 57 is an apparatus for performing reading and writing for a digital versatile disc (DVD).

The LAN interface 53 is coupled to the CPU 52 by peripheral component interconnect express (PCIe), and the HDD 54 and the ODD 57 are coupled to the CPU 52 by serial advanced technology attachment (SATA). The super IO 55 is coupled to the CPU 52 by low pin count (LPC).

The cluster construction program to be executed by the computer 50 is stored into a DVD that is an example of a recording medium capable of being read by the computer 50, and is read out from the DVD by the ODD 57 and installed into the computer 50. As an alternative, the cluster construction program is stored into a database or the like of a different computer system coupled through the LAN interface 53, and is read out from the data base and installed into the computer 50. Then, the installed cluster construction program is stored into the HDD 54, read out into the main memory 51 and executed by the CPU 52.

Further, while the embodiment is directed to a case in which the node 2 is an information processing apparatus that updates the database 4, the node 2 may otherwise be an information processing apparatus that performs different information processing. Further, while, in the embodiment, the handicap determination unit 3b determines a handicap of a node 2 based on the writing performance into a temporary file for accumulating update differences, the handicap determination unit 3b may determine a handicap otherwise based on some other performance of a node 2.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for taking over a process in a processing system, the processing system including a plurality of node groups, each node group including one or more of nodes, the method comprising:
   determining, by a processor of a computer configured to belong to a first group among the plurality of node groups, whether a communication failure with any other of the plurality of node groups is detected;
   starting a time count in response to a determination result indicating that the communication failure is detected; and
   starting a takeover process in response to detecting that a handicap time has elapsed in the time count, the takeover process including performing a fencing process to the nodes included in the any other of the plurality of node groups, the handicap time having a time length adjusted in accordance with a total number of nodes included in the first group.

2. The method according to claim 1, wherein the handicap time of the first group is less than the handicap time of the any other of the plurality of node groups when the first group includes nodes exceeding one half of a total number of nodes included in the processing system.

3. The method according to claim 1, wherein the handicap time of the first group is less than the handicap time of a second group when the first group includes an operation node, the second group being a node group that includes nodes that does not exceed one half of a total number of nodes included in the processing system and that does not include an operation node.

4. The method according to claim 3, wherein the handicap time of a second group is the minimum one of handicap times allocated to nodes in the second group, the nodes in the second groups being nodes to each of which the handicap time longer than the handicap time allocated to the operation node is allocated in accordance with a performance.

5. The method according to claim 1, wherein the operation node is configured to update a database; a standby node from among the nodes includes a duplicate of the database, the standby node being configured to receive an update difference of the database from the operation node to update an own database, the standby node being a node other than the operation node; and the handicap time is adjusted based on a writing performance into a file for temporarily accumulating the update difference.

6. An apparatus for taking over a process in a processing system, the processing system including a plurality of node groups, each node group including one or more of nodes, the apparatus being configured to belong to a first group among the plurality of node groups, the apparatus comprising:
   a memory; and
   a processor coupled to the memory and configured to
      determine whether a communication failure with any other of the plurality of node groups is detected,
      start a time count in response to a determination result indicating that the communication failure is detected, and
      start a takeover process in response to detecting that a handicap time has elapsed in the time count, the takeover process including performing a fencing process to the nodes included in the any other of the plurality of node groups, the handicap time having a time length adjusted in accordance with a total number of nodes included in the first group.

7. The apparatus according to claim 6, wherein the handicap time of the first group is less than the handicap time of the any other of the plurality of node groups when the first group includes nodes exceeding one half of a total number of nodes included in the processing system.

8. The apparatus according to claim 6, wherein the handicap time of the first group is less than the handicap time of a second group when the first group includes an operation node, the second group being a node group that includes nodes that does not exceed one half of a total number of nodes included in the processing system and that does not include an operation node.

9. The apparatus according to claim 8, wherein the handicap time of a second group is the minimum one of handicap times allocated to nodes in the second group, the nodes in the second groups being nodes to each of which the handicap time longer than the handicap time allocated to the operation node is allocated in accordance with a performance.

10. The apparatus according to claim 6, wherein
the operation node is configured to update a database;
a standby node from among the nodes includes a duplicate of the database, the standby node being configured to receive an update difference of the database from the operation node to update an own database, the standby node being a node other than the operation node; and
the handicap time is adjusted based on a writing performance into a file for temporarily accumulating the update difference.

11. A non-transitory computer-readable storage medium for storing a program which causes a processor to perform processing for taking over a process in a processing system, the processing system including a plurality of node groups, each node group including one or more of nodes, the processor being included in a computer configured to belong to a first group among the plurality of node groups, the processing comprising:
determining whether a communication failure with any other of the plurality of node groups is detected;
starting a time count in response to a determination result indicating that the communication failure is detected;
starting a takeover process in response to detecting that a handicap time has elapsed in the time count, the takeover process including performing a fencing process to the nodes included in the any other of the plurality of node groups, the handicap time having a time length adjusted in accordance with a total number of nodes included in the first group.

12. The non-transitory computer-readable storage medium according to claim 11,
wherein the handicap time of the first group is less than the handicap time of the any other of the plurality of node groups when the first group includes nodes exceeding one half of a total number of nodes included in the processing system.

13. The non-transitory computer-readable storage medium according to claim 11,
wherein the handicap time of the first group is less than the handicap time of a second group when the first group includes an operation node, the second group being a node group that includes nodes that does not exceed one half of a total number of nodes included in the processing system and that does not include an operation node.

14. The non-transitory computer-readable storage medium according to claim 13, wherein
the handicap time of a second group is the minimum one of handicap times allocated to nodes in the second group, the nodes in the second groups being nodes to each of which the handicap time longer than the handicap time allocated to the operation node is allocated in accordance with a performance.

15. The non-transitory computer-readable storage medium according to claim 11, wherein
the operation node is configured to update a database;
a standby node from among the nodes includes a duplicate of the database, the standby node being configured to receive an update difference of the database from the operation node to update an own database, the standby node being a node other than the operation node; and
the handicap time is adjusted based on a writing performance into a file for temporarily accumulating the update difference.

* * * * *